United States Patent [19]
West

[11] 3,851,990
[45] Dec. 3, 1974

[54] DISPOSABLE DRILL GUIDE AND METHOD FOR DRILLING WORKPIECES

[75] Inventor: Robert F. West, West Simsbury, Conn.

[73] Assignee: The Stanley Works, New Britain, Conn.

[22] Filed: Nov. 19, 1973

[21] Appl. No.: 417,480

[52] U.S. Cl. .................................... 408/1, 408/72
[51] Int. Cl. .......................................... B23b 49/02
[58] Field of Search ........ 408/72, 72 B, 115, 115 B, 408/241 B

[56] References Cited
FOREIGN PATENTS OR APPLICATIONS
213,145   3/1924   Great Britain ...................... 408/72

Primary Examiner—Andrew R. Juhasz
Assistant Examiner—Z. R. Bilinsky

[57] ABSTRACT

A guide is provided which is particularly adapted to be employed for purposes of guiding a drill bit into engagement with a predetermined spot on a workpiece. The guide preferably is constructed so as to be relatively inexpensive to manufacture thereby making it feasible to dispose of the guide after a single use thereof. The guide is formed in the shape of a relatively thin disc. A hole of suitable dimension is provided substantially at the center of the disc extending completely therethrough. One end of the aforementioned hole is countersunk thereby providing the disc with one side which has a tunnel-shaped depression formed therein. This depression functions as a guide means for guiding the drill bit into the hole. The other side of the disc is provided with a layer of a pressure-sensitive adhesive operable for adhering the guide to the surface of the workpiece. In addition, the latter adhesive layer is preferably covered with a suitable detachable release paper which functions as a protective cover over the adhesive until such time as the guide is to be employed.

10 Claims, 5 Drawing Figures

PATENTED DEC 3 1974  3,851,990

DISPOSABLE DRILL GUIDE AND METHOD FOR DRILLING WORKPIECES

BACKGROUND OF THE INVENTION

It has been known heretofore in the prior art to utilize means for guiding a drill bit into engagement with a preselected spot on a workpiece. Most commonly, such means are employed at least in connection with the initial step of the drilling process, the starting of a hole in the surface of the workpiece. The desirability of using some such form of drill guide for this purpose can be readily attested to by anyone who has suffered the experience of having the tip of the drill bit slide along the surface of the workpiece as an attempt was being made to start a hole in the surface of a given workpiece.

More specifically, there are basically two different functions which a drill guide is generally intended to perform. The first of these is that the drill guide functions to precisely locate the drill bit relative to the surface of a workpiece whereby to ensure that the hole being drilled is properly drilled in the desired spot. Secondly, primarily in those instances where the drill is not fixedly mounted relative to the workpiece, the drill guide is intended to function as a means of assisting in starting the hole which is to be drilled.

Drill guides have been provided in a variety of different forms heretodate. Most often, it is generally found that the particular form of drill guide which is employed in a given work application is dictated by the type of use to which it is desired to put the drill guide. For example, in industrial concerns which produce large quantities of the same type of products, drill guides are commonly provided in the form of jigs and fixtures operable to permit the repetitive drilling of the necessary holes in the components which make up the product. Another type of application in which drill guides are commonly found employed involves the drilling of holes in a part wherein it is essential that the holes be precisely located relative to each other as well as the other identifying features which are embodied in the part. In the latter case, drill guides in the form of templates are used to achieve the desired accuracy, with the templates being positioned in overlying relation over the parts in properly aligned relative thereto.

The extent to which drill guides are utilized is often found to be directly related to the cost thereof. More specifically, in large scale manufacturing operations, the cost of providing drill guides may be relatively insignificant as compared to the other costs of manufacture. Moreover, the advantages to be derived from employing drill guides clearly can be shown to justify the expense of providing them. Therefore, widespread use of drill guides is found to exist in many industries. On the other hand, for those work applications wherein a drill is only infrequently required to be used, the cost of providing the types of drill guides previously referred to hereinabove may be found to be prohibitive. Also, as is readily recognized by all, there are an increasingly large number of homeowners who are trying their hand at being amateur do-it-yourselfers. One of the first purchases that these homeowners make in this connection is that of an electrical drill. As a result, a large market has developed for a drill guide which would be capable of being employed with the variety of different types of drills which are commercially available today, that would be simple to employ, and that would be relatively inexpensive to purchase so that it would be economical for the homeowner or other individual who makes infrequent use of his drill to maintain a supply of drill guides readily available for use when necessary and would also render it feasible for the drill guide to be discarded after a single use has been made thereof. Another desirable characteristic that such drill guides should possess is that they be capable of relative universal application. Namely, a separate drill guide should not be required for each different size of drill bit. Rather, the drill guides should be capable of being utilized with drill bits of varying sizes. In addition, it is desirable that the drill guide be equally applicable for use when a hole is being drilled in different types of materials, i.e., metal, wood, etc.

Accordingly, it is an object of the present invention to provide a novel and improved drill guide which is capable of performing the dual functions of identifying the precise spot on the surface of a workpiece whereat a hole is to be drilled and of assisting in initially starting a hole which is to be drilled.

It is also an object of the present invention to provide such a drill guide which is constructed so as to be capable of being manufactured inexpensively thereby making it feasible to dispose of the drill guide after only a single use has been made thereof, and also making it economical to maintain a supply thereof on hand for use as required.

It is another object of the present invention to provide such a drill guide which is capable of being employed with drill bits of varying sizes.

A further object of the present invention is to provide such a drill guide which is capable of being utilized in conjunction with the drilling of a hole in different material such as metal, wood, etc.

A still further object of the present invention is to provide such a drill guide which is readily capable of being used with the types of drills that are commercially available today.

Yet another object of the present invention is to provide such a drill guide which is capable of being employed in association with other types of means which are themselves operable as forms of drill guides.

Yet still another object of the present invention is to provide a simple and fast method for drilling workpieces.

SUMMARY OF THE INVENTION

It has now been found that the foregoing and related objects can be readily attained in a drill guide which is particularly adapted to be employed for purposes of guiding a drill bit into engagement with a predetermined spot on a workpiece. The guide is formed in the shape of a relatively thin disc. A hole of suitable dimension is provided substantially at the center of the disc extending completely therethrough. One end of the aforementioned hole is provided with aligning means operable for guiding the drill bit into the hole. The other side of the disc is provided with securing means for detachably fastening the guide to the surface of the workpiece. The latter described securing means is provided with covering means which functions as a protective cover for the securing means until such time as the guide is to be employed.

In accordance with the preferred embodiment of the invention, the drill guide is constructed so as to be relatively inexpensive to manufacture thereby making it feasible to dispose of the guide after a single use has been made thereof. The aligning means with which the guide is provided comprises a countersink which is formed at one end of the hole thereby providing the disc with one side which has a funnel-shaped depression operable for aligning the drill bit with the hole and guiding it therein. The securing means which is provided on the other side of the disc takes the form of a layer of pressure-sensitive adhesive which is capable of being employed to adhere the guide to the surface of the workpiece. The latter adhesive layer is preferably covered with a suitable detachable release paper which functions as a protective cover to prevent the adhesive from accidentally becoming adhered to a undesired surface before the drill guide is placed in use. The drill guide is preferably formed from either a soft metal or a hard plastic material so that as the drill bit begins to turn in the hole formed in the drill guide, if the diameter of the drill bit exceeds that of the latter hole, the drill bit will operate to enlarge the hole in the drill guide to correspond in size to at least the size of the drill bit.

Certain objects of the invention may be attained in accordance with the method wherein a drill guide is utilized for drilling workpieces. In accord with this method, the sealing paper is removed thereby uncovering the layer of adhesive on the drill guide. The latter is then placed over the spot on the surface of the workpiece whereat it is desired to drill a hole, with the side of the drill guide which carries the adhesive layer being opposite the aforedescribed spot. Then, with the center of the hole in the drill guide aligned over the spot at which it is desired to drill a hole, the drill guide is pressed down so that the pressure-sensitive adhesive on the bottom surface thereof is brought into engagement and adheres to the surface of the workpiece to retain the drill guide properly positioned on the workpiece. The drill bit is now placed into the countersunk depression formed on the other side of the drill guide and is guided into the hole formed in the drill guide and into engagement with the surface of the workpiece whereupon it is operable to drill the desired hole on the preselected spot on the surface of the workpiece. As the drill bit turns, it will drill its size through the drill guide and into the workpiece.

DETAILED DESCRIPTION OF THE ILLUSTRATED EMBODIMENT

Figure 1:
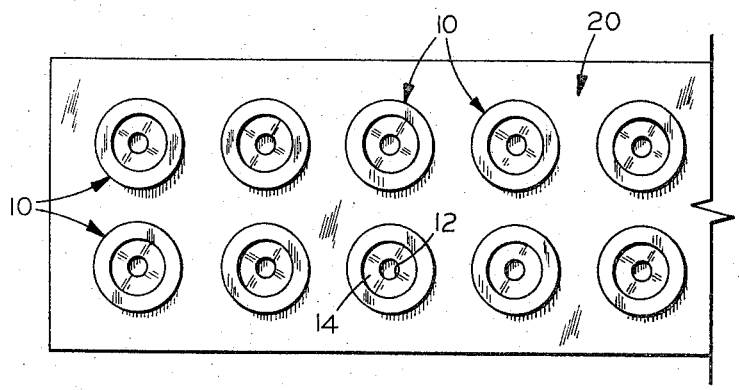
FIG. 1 is a top view of a portion of a strip embodying thereon a plurality of drill guides constructed in accordance with the present invention.
Figure 2:
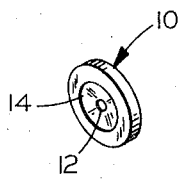
FIG. 2 is a perspective view of the top surface of the drill guide constructed in accordance with the present invention illustrating the countersink formed therein.

Referring now to the drawings, and more particularly, FIG. 1 thereof, there is illustrated therein a portion of a package of a plurality of drill guides, each of which is generally designated by reference numeral 10 and is constructed in accordance with the present invention. Each of the drill guides 10 is intended to be operable for purposes of guiding a drill bit into engagement with a predetermined spot on the surface of a workpiece. The drill guide 10 as best seen with reference to FIGS. 1, 2 and 3 of the drawings, comprises a guide member which is formed generally in the shape of a relatively thin disc. Preferably, the drill guide 10 is made from a relatively soft material for a reason yet to be set forth. As employed herein, the term relatively soft material is intended to refer to soft metal or a synthetic resin, i.e. a hard plastic material.

Figure 4:
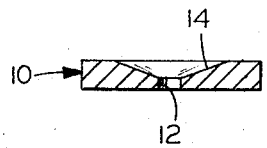
FIG. 4 is a cross-sectional view of a drill guide constructed in accordance with the present invention.
Figure 5:
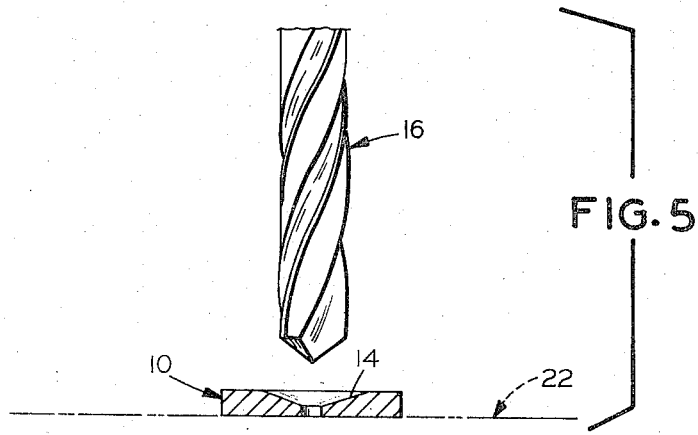
FIG. 5 is a cross-sectional view of a drill guide constructed in accordance with the present invention illustrated supported on a surface and depicting also a drill bit with which the drill guide is intended to be employed.

The drill guide 10 as best understood with reference to FIGS. 4 and 5 of the drawings, has a guide passage, i.e., a hole 12 formed completely therethrough. The hole 12 is provided substantially at the center of the drill guide 10. In accord with one embodiment of the present invention, the drill guide 10 has a diameter of approximately 0.3 inches and the hole 12 therein has a diameter of approximately 0.04 inches. It is, of course, to be understood however, that the drill guide 10 may have a larger or a smaller diameter without departing from the essence of the invention. Similarly, the dimension of the hole 12 may be varied without departing from the essence of the invention.

On one side of the drill guide 10 the end of the hole 12 formed therein is countersunk as shown at 14 in the drawings. The countersink provides the drill guide 10 with a funnel-shaped depression. The latter depression functions as an aligning and guiding means for the drill bit 16 in a manner which will be more fully set forth hereinafter.

Figure 3:
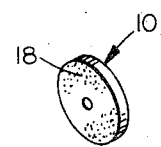
FIG. 3 is a perspective view of the bottom surface of a drill guide constructed in accordance with the present invention illustrating the layer of pressure-sensitive adhesive provided thereon.

The other side of the drill guide 10 is provided as best seen in FIG. 3 of the drawings with a layer 18 of a suitable pressure-sensitive adhesive. In accord with the illustrated embodiment of the invention, the entire bottom surface of the drill guide 10 is provided with the adhesive. It is, of course, to be understood however, that only a lesser extent of the bottom surface of the drill guide 10 could be covered with a layer 18 of adhesive, if so desired, without departing from the essence of the invention.

Turning now again to a consideration of FIG. 1 of the drawings, as depicted therein a plurality of drill guides 10 are shown positioned on a strip of material, the latter being generally designated by reference numeral 20. More particularly, the drill guides 10 are placed on the strip 20 so as to be suitably spaced relative to each other in a pair of columns with the bottom surface of the drill guides 10 on which the layer of pressure-sensitive adhesive is provided being in engagement with the surface of the strip 20. The strip 20 performs a dual function. Because of the relatively small size of the drill guides 10 it is desirable to provide some means of assuring that an individual drill guide 10 is not accidentally misplaced, discarded, thrown out, etc. Thus, the strip 20 provides a convenient means of grouping together a plurality of drill guides 10 on a common support member 20. In addition, the strip 20 may form the basis of a multi-component assembly whereby a multiplicity of drill guides 10 may be grouped together for convenience in marketing drill guides 10. The second function which the strip 20 performs is that of protective cover for the layer 18 of adhesive which covers the bottom surface of the drill guide 10. In the absence of such a cover, it would be very likely that the adhesive layer 18 on the drill guide 10 would come in contact with some form of surface whereby to cause the drill guide 10 to become accidentally adhered thereto. Thus, it is preferable for purposes of preventing the drill guide 10 from becoming adhered to an undesired surface that the adhesive layer 18 be covered. Although in accord with the illustrated embodiment, the strip 20 has been shown as comprising the aforedescribed cover, it is also, of course, to be understood that if so desired, each individual drill guide 10 could have the adhesive layer 18 thereof covered by a separate piece of release paper (not shown) equal or slightly larger than the area of the drill guide 10 covered by the adhesive layer 18.

With reference particularly to FIG. 5 of the drawings, a description will now be set forth of the manner in which a drill guide 10 is preferably intended to be employed. Assuming that the drill guide 10 is provided as one of a multiplicity thereof supported on the strip 20, the drill guide 10 is removed from the strip 20 whereby to uncover the layer 18 of adhesive provided on one surface of the drill guide 10. With the adhesive layer 18 exposed, the drill guide 10 is placed over the spot on the surface of the workpiece 22 whereat it is desired to drill a hole. The drill guide 10 is positioned relative to the workpiece surface 22 so that the side of the drill guide 10 which carries the adhesive layer 18 is in engagement with the workpiece 22. Then, with the hole 12 in the drill guide 10 centered over the aforereferenced spot on the surface of the workpiece 22, the drill guide 10 is pressed down so that the pressure-sensitive adhesive on the bottom surface thereof is caused to adhere to the surface of the workpiece 22 whereby to be operable to cause the drill guide 10 to be retained properly positioned on the workpiece 22. Thereafter, with the portion of the workpiece 22 whereat the aforedescribed spot thereof is located and the drill bit 16 aligned relative to each other, the drill bit 16 is guided into the countersunk depression 14 provided at one end of the hole 12 on one surface, i.e., the upper surface as viewed with reference to FIG. 5 of the drawings, of the drill guide 10. The sloping sides of the countersink 14 function to guide the drill bit 16 into the hole 12. Assuming that the diameter of the hole 12 exceeds that of the drill bit 16, the latter passes through the hole 12 and engages the spot on the surface of the workpiece 22 whereat it is desired to drill a hole. As the drill bit 16 initially begins to drill the latter hole, it is held against horizontal movement relative to the surface of the workpiece 22 by the side walls of the hole 12 in the drill guide 10. More specifically, the side walls of the hole 12 function to guide the drill bit 16 until the hole being drilled in the workpiece 22 reaches a sufficient depth whereat the side walls of the hole being drilled are capable of providing the necessary guiding support for the drill bit 16 until the drilling of the hole is completed. In the event that the diameter of the drill bit 16 exceeds that of the hole 12 in the drill guide 10, by forming the drill guide 10 from a suitable soft metal or hard plastic, the drill bit 16 is capable as it twists to drill its size through the drill guide 10 as it moves into engagement with the spot on the surface of the workpiece 22 and performs its intended function of drilling the desired hole in the latter. After the desired hole has been drilled in the workpiece 22, the drill bit 16 is removed therefrom and from the hole 12 of the drill guide 10. Then the drill guide 10 may be easily removed from the surface of the workpiece 22 because of the use of a pressure-sensitive adhesive as the means for adhering the drill guide 10 to the workpiece 22. Finally, because of the relatively inexpensiveness of the drill guide 10, it is not necessary to save the drill guide 10 for purposes of making use thereof again subsequently. Rather, the drill guide 10 may be discarded and a new one utilized the next time it is necessary to drill a hole in a workpiece.

Although only one embodiment of a drill guide constructed in accordance with the present invention has been shown in the drawings and described hereinabove, it is to be understood that modifications in the construction thereof may be made thereto by those skilled in the art without departing from the essence of the invention. In this connection, some of the modifications which can be made in the drill guide 10 have been alluded to hereinabove while others will become readily apparent to those skilled in the art when exposed to the present description and illustration of the construction of the drill guide 10. For example, it has been set forth hereinabove, that the drill guide may be formed from either a soft metal or a hard plastic material to permit the drill bit, if the diameter of the drill bit exceeds that of the hole in the drill guide, to drill its way therethrough as it moves into engagement with the workpiece. Similarly, it has been noted previously that the diameter of the drill guide as well as the diameter of the hole provided therein may be varied for purposes of meeting the requirements of different work applications. Moreover, the protective cover which is utilized for purposes of covering the layer of adhesive with which the drill guide is provided may take the form of a strip as depicted in the drawings on which a multiplicity of drill guides are supported, or the protective cover may comprise a separate piece of release paper with each drill guide having its own individual protective cover. In addition, although the use of an ever-tacky pressure-sensitive adhesive preferably adherent to plastic is desired because of its ease of handling in facilitating the application and removal of a drill guide from a surface of a workpiece, other forms of adhesive or other means capable of performing the desired function of retaining the drill guide positioned properly on the workpiece may also be employed. Also, although the drill guide has been described and illustrated as having the shape of a disc, it is, of course, to be understood that the drill guide could equally well have a polygonal shape without departing from the essence of the invention.

Thus, it can be seen that the present invention provides a novel and improved drill guide which is capable of performing the dual functions of identifying the precise spot on the surface of a workpiece whereat a hole is drilled. Moreover, in accord with the present invention a drill guide is provided which is constructed so as to be capable of being manufactured inexpensively thereby making it feasible to dispose of the drill guide after only a single use has been made thereof, and also making it economical to maintain a supply thereof on hand for use as required. The drill guide of the present invention is capable of being employed with drill bits of varying sizes. Furthermore in accord with the present invention a drill guide has been provided which is capable of being utilized in conjunction with the drilling of a hole in different materials such as metal, wood, etc. In addition, a drill guide has been provided in accordance with the present invention which is readily capable of being used with the types of drills which are commercially available today. Also, in accord with the present invention a drill guide is provided which is capable of being employed in association with other types of means which are themselves operable as forms of drill guides. Finally, there has been provided in accordance with the present invention, a simple and fast method of drilling workpieces.

Having thus described the invention, I claim:

1. A drill guide for guiding a drill bit into contact with a predetermined location on the surface of a workpiece comprising:
   a. a guide member formed of relatively soft material and having substantial thickness providing generally parallel top and bottom surfaces, said guide member having a guide passage of generally circular cross section therethrough from said top to said bottom surface whereby the guide passage of the drill guide may be aligned over the desired location of the workpiece, said passage having an outwardly flaring portion adjacent the upper end thereof to provide a guide surface for directing the drill bit into the center of the passage portion at the lower end thereof; and
   b. adhesive means on said lower surface for securing said guide member on the surface of the workpiece.

2. The drill guide as set forth in claim 1 wherein said soft material from which said member is formed comprises a soft metal.

3. The drill guide as set forth in claim 1 wherein the soft material from which said member is formed comprises a synthetic resin.

4. The drill guide as set forth in claim 1 wherein said adhesive means comprises a layer of ever-tacky pressure sensitive adhesive.

5. The drill guide as set forth in claim 1 wherein said outwardly flaring portion is formed by a countersink.

6. The drill guide as set forth in claim 1 further comprising release cover means on said adhesive means and readily removable therefrom to expose said adhesive means.

7. A multi-component assembly of drill guides each of the type operable for guiding a drill bit into contact with a predetermined location on the surface of a workpiece comprising:
   a. an elongated strip of material; and
   b. a multiplicity of drill guides each comprising a guide member formed of relatively soft material and having substantial thickness providing generally parallel top and bottom surfaces, said guide member having a guide passage of generally circular cross section therethrough from said top to said bottom surface whereby the guide passage of the drill guide may be aligned over the desired location of the workpiece, said passage having an outwardly flaring portion adjacent the upper end thereof to provide a guide surface for directing the drill bit into the center of the passage portion at the lower end thereof and adhesive means on said lower surface for securing said guide member on the surface of said strip.

8. The multi-component assembly as set forth in claim 7 wherein said adhesive means provided on said lower surface of each of said multiplicity of drill guides comprises a layer of ever-tacky pressure sensitive adhesive.

9. A method of drilling a hole in a workpiece employing a drill guide having a hole formed completely therethrough, a countersink provided at one end of the hole on one surface thereof and an adhesive coating provided on the other surface thereof comprises the steps of:
   a. exposing the adhesive coating on the drill guide;
   b. aligning the center of the hole in the drill guide with the spot on the workpiece whereat a hole is to be drilled;
   c. placing the drill guide on the workpiece with the adhesive coating on the drill guide engaging the surface of the workpiece and with the hole in the drill guide overlying the spot on the workpiece whereat the hole is to be drilled;
   d. pressing the drill guide firmly against the surface of the workpiece to adhere the drill guide to the workpiece;
   e. guiding a drill bit into the countersink in the drill guide and therefrom into the hole formed in the drill guide;
   f. passing the drill bit through the hole in the drill guide into engagement with the spot on the workpiece;
   g. causing the drill bit to be twisted to drill a hole to the desired depth in the workpiece;
   h. withdrawing the drill bit from the drilled hole in the workpiece and from the hole in the drill guide; and
   i. removing the drill guide from the surface of the workpiece.

10. The method as set forth in claim 9 further comprising the step of enlarging the diameter of the hole in the drill guide as the drill bit passes therethrough before reaching the surface of the workpiece.

* * * * *